United States Patent
Neal et al.

(10) Patent No.: US 10,017,239 B2
(45) Date of Patent: Jul. 10, 2018

(54) DYNAMIC CONFORMAL AERODYNAMIC SEAL (CAS) FOR AIRCRAFT CONTROL SURFACES

(71) Applicant: NORTHROP GRUMMAN SYSTEMS CORPORATION, Falls Church, VA (US)

(72) Inventors: Matthew A. Neal, Palmdale, CA (US); Charles R. Smith, Acton, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 478 days.

(21) Appl. No.: 14/974,990

(22) Filed: Dec. 18, 2015

(65) Prior Publication Data

US 2017/0174315 A1    Jun. 22, 2017

(51) Int. Cl.
*B64C 9/02* (2006.01)
*F16J 15/34* (2006.01)

(52) U.S. Cl.
CPC .............. *B64C 9/02* (2013.01); *F16J 15/3444* (2013.01)

(58) Field of Classification Search
CPC ................................ F16J 15/3444; B64C 9/02
See application file for complete search history.

(56) References Cited

U.S. PATENT DOCUMENTS

| | | |
|---|---|---|
| 5,622,336 A | 4/1997 | Chavanne et al. |
| 5,845,877 A * | 12/1998 | Justice .................. B64C 7/00 244/131 |
| 5,913,494 A | 6/1999 | Burbridge et al. |
| 6,655,635 B2 | 12/2003 | Maury et al. |
| 7,051,982 B1 | 5/2006 | Johnson |
| 7,611,099 B2 | 11/2009 | Kordel et al. |
| 7,669,800 B2 | 3/2010 | Hernandez |
| 7,815,147 B2 | 10/2010 | Hernandez |
| 8,342,452 B2 | 1/2013 | Candela et al. |
| 8,360,438 B2 | 1/2013 | Wildman et al. |
| 8,476,564 B2 | 7/2013 | Henry et al. |
| 8,556,214 B2 | 10/2013 | McAllinden et al. |
| 8,876,051 B2 | 11/2014 | Stewart |
| 8,882,045 B2 | 11/2014 | Roth |
| 8,899,528 B2 | 12/2014 | Coconnier |
| 8,919,703 B2 | 12/2014 | Parker |
| 9,053,643 B2 * | 6/2015 | Paavilainen .............. G09F 3/03 |
| 9,242,718 B2 * | 1/2016 | Wilson ...................... B64C 7/00 |
| 2006/0145012 A1 | 7/2006 | Hernandez |
| 2006/0249627 A1 | 11/2006 | Martin Hernandez |
| 2013/0214096 A1 | 8/2013 | Wilson et al. |
| 2013/0228983 A1 | 9/2013 | Wilson et al. |
| 2014/0023837 A1 | 1/2014 | Miller et al. |
| 2014/0131513 A1 | 5/2014 | Bjerkemo |
| 2016/0229526 A1 * | 8/2016 | Hegenbart ................ B64C 9/02 |

* cited by examiner

*Primary Examiner* — Brian M O'Hara
(74) *Attorney, Agent, or Firm* — John A. Miller; Shumaker, Loop & Kendrick, LLP

(57) ABSTRACT

A dynamic conformal aerodynamic seal that bridges the gap between an aircraft control surface and an aircraft wing, stabilizer or tail. The seal has a first edge and a second edge, where the first edge of the seal is rigidly coupled to the aircraft wing, stabilizer or tail and the second edge of the seal is slidably coupled to the control surface by magnetic coupling so that when the control surface pivots relative to the aircraft wing, stabilizer or tail, the second edge of the seal slides along the control surface.

20 Claims, 3 Drawing Sheets

DYNAMIC CONFORMAL AERODYNAMIC SEAL (CAS) FOR AIRCRAFT CONTROL SURFACES

BACKGROUND

Field

This invention relates generally to a dynamic conformal aerodynamic seal (CAS) that covers the gap between an aircraft control surface and an aircraft structure and, more particularly, to a dynamic CAS that covers the gap between an aircraft control surface and an aircraft wing, stabilizer or tail, where one edge of the seal is rigidly secured to the aircraft wing, stabilizer or tail and an opposite edge of the seal is slidably attached to the control surface through magnetic coupling.

Discussion

A typical fixed wing aircraft includes a number of control surfaces pivotally attached to an aircraft wing, stabilizer or tail that when moved up and down relative to the wing or tail provide roll, yaw and pitch control of the aircraft. Since these types of control surfaces are actuated relative to the wing, stabilizer or tail, a gap is necessary between the control surface and the wing, stabilizer or tail. However, the gap decreases the aerodynamic performance of the aircraft, as well as having other drawbacks.

For certain types of high performance aircraft, such as military aircraft, it is known to provide a fairing blade seal across the gap between the wing and the control surface that is rigidly secured at one edge to the aircraft wing and slidably secured at its other edge to the control surface so as to allow better airflow across the wing and control surface, where the fairing seal provides a smooth transition from the wing to the control surface. A traditional fairing blade seal for this purpose is typically a rigid composite member that has a certain amount of flexibility that allows it to perform the desired function. The blade seal is rigidly secured to the wing in such a manner that it is under preload tension when positioned against the control surface so that it operates as a type of leaf spring to maintain contact with the control surface. As the control surface pivots up and down to control the aircraft flight direction, the blade seal flexes in a manner that maintains the aerodynamic coupling between the wing and the control surface, where the edge of the blade seal slides along the control surface.

Because the blade seal is under a significant amount of preload pressure when positioned against the control surface to maintain the aerodynamic configuration, the sliding movement of the blade seal against the control surface causes significant wear on the control surface that removes coatings and other surfaces therefrom. Further, as the edge of the fairing seal rubs against the control surface under pressure during operation of the control surface, material is also worn off of the seal and the seal becomes sharper, where it eventually will need to be replaced. The process of replacing the fairing seal with a new fairing blade seal that has the proper spring tension on the control surface and repairing the control surface is a difficult and time consuming process.

SUMMARY

The present invention discloses and describes a dynamic conformal aerodynamic seal that bridges the gap between an aircraft control surface and an aircraft wing, stabilizer or tail. The seal has a first edge and a second edge, where the first edge of the seal is rigidly coupled to the aircraft wing, stabilizer or tail and the second edge of the seal is slidably coupled to the control surface by magnetic coupling such that when the control surface pivots relative to the aircraft wing, stabilizer or tail, the second edge of the seal slides along the control surface.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a conformal aerodynamic seal that covers a gap between an aircraft control surface and an aircraft structure and is magnetically coupled to the control surface is merely exemplary in nature, and is in no way intended to limit the invention or its applications or uses. For example, the discussion herein of the conformal aerodynamic seal is described generally in connection with a high performance military aircraft. However, as will be appreciated by those skilled in the art, the seal may have application for other types of aircraft.

Figure 1:
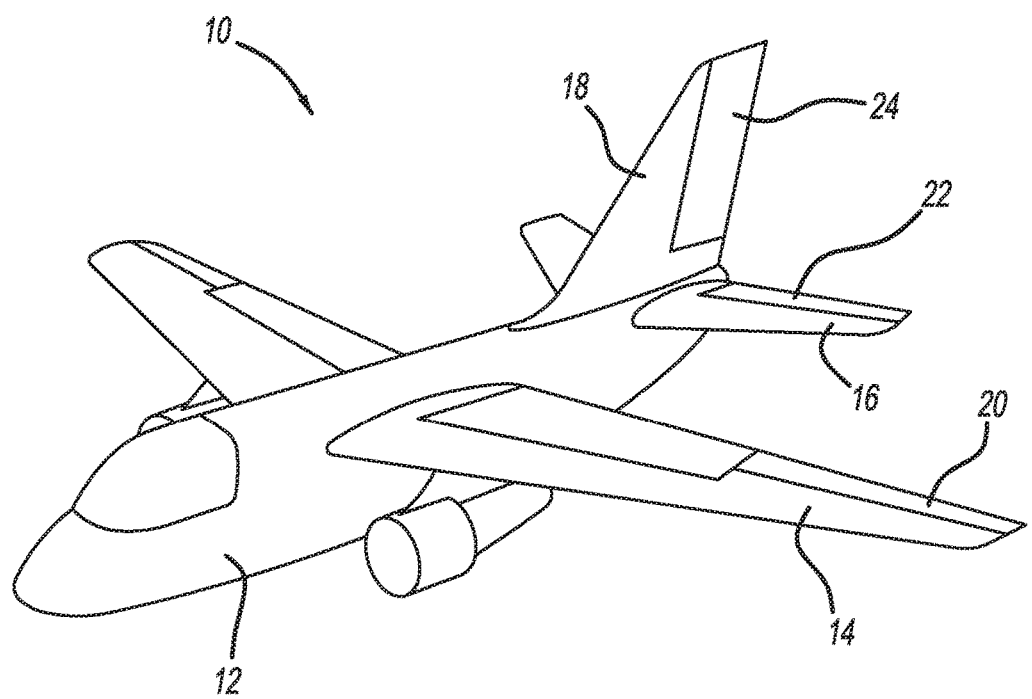
FIG. 1 is an isometric view of an aircraft showing aircraft control surfaces.

FIG. 1 is an isometric view of an aircraft 10 including a fuselage 12, wings 14, horizontal stabilizers 16 and a vertical stabilizer or tail 18. The aircraft 10 includes a number of control surfaces for providing roll control, pitch control and yaw control, specifically ailerons 20 on the wings 14, elevators 22 on the stabilizers 16 and a rudder 24 on the tail 18, respectively. The aircraft 10 is intended to be a general representation of any fixed wing aircraft including both military and commercial aircraft.

Figure 2:
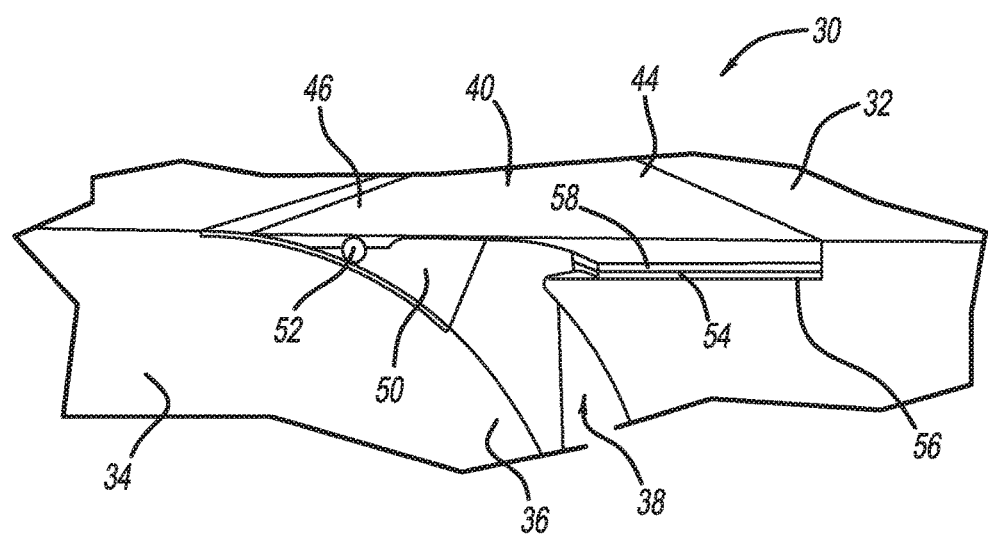
FIG. 2 is a cut-away, isometric view of a portion of an aircraft wing including a control surface and a conformal aerodynamic seal, where a ferromagnetic strip is provided on the control surface and a magnet is provided on the seal to provide magnetic coupling therebetween.

FIG. 2 is a cut-away isometric view of an aircraft wing 30 and is intended to be a general representation of any aircraft wing, stabilizer or tail, such as those referred to above. The aircraft wing 30 includes a main wing structure 32 and a control surface 34 pivotally attached thereto in any suitable and known manner so that the control surface 34 can rotate up and down to provide aircraft flight control for one of roll, pitch or yaw. The control surface 34 has a general tear drop shape and includes a rounded end portion 36 positioned adjacent to the wing structure 32, where a gap 38 is formed therebetween. A flexible dynamic conformal aerodynamic seal (CAS) 40 is rigidly secured to the wing structure 32 along a mounting edge 44 and is slidably attached to the control surface 34 along a knife edge 46 opposite to the edge 44 through magnetic coupling, as will be discussed in more detail below. Because of this magnetic coupling it is not necessary to provide the CAS 40 under spring load tension to hold the knife edge 46 against the control surface 34 as is typically now done in the art. It is noted that the illustrations provided herein only show a seal at a top surface of the structure 32. However, as will be appreciated by those skilled in the art, a seal may also be provided a bottom surface of the structure 32. It is also noted that the seal 40 can be made of any suitable material, such as a carbon fiber composite, aluminum, etc. so that it is sufficiently flexible and can be made of a magnetic material itself. Also, the seal can have any thickness suitable for the purposes discussed herein.

In this embodiment, a ferromagnetic strip 50, for example, a suitable material that could exhibit spontaneous magnetism when in the presence of a magnetic field, is bonded to a portion of the rounded end 36 of the control surface 34 at the location where the knife edge 46 contacts the surface 34 and a magnet 52 is attached to an under surface of the knife edge 46, as shown. Also, in this embodiment, both the ferromagnetic strip 50 and the magnet 52 extend the length of the seal 40. However, in alternate embodiments, multiple ferromagnetic strips and magnets may be employed or the ferromagnetic strip 50 and the magnet 52 may only extend some distance along the length of the seal 40. In one embodiment, the strip 50 has a suitable width so that the magnet 52 maintains contact with the strip 50 through the complete rotation of the control surface 34 for the aircraft control. However, in other embodiments, the magnet 52 may not maintain contact with the strip 50 through the complete rotation of the control surface 34. The ferromagnetic strip 50 can be attached to the control surface 34 in any suitable manner. Examples include, but are not limited to, using an adhesive to secure the strip 50 to the surface 34, bolting a ferromagnetic strip assembly to the control surface 34, providing the ferromagnetic strip 50 as part of a coating on the control surface 34, spraying the strip 50 onto the control surface 34, etc. Likewise, the magnet 52 can be attached to the under surface of the seal 40 in any suitable manner, including adhesive, bolts, etc. In this non-limiting embodiment, the magnet 52 is a cylindrical magnet, and can be made by, for example, an extrusion process. This cylindrical configuration of the magnet 52 limits the contact with the control surface 34, which reduces the wear on the magnet 52. However, as will be appreciated by those skilled in the art, the magnet 52 can be formed in other shapes, and may depend on the particular aircraft structure it is being designed for. Further, although the magnet 52 is shown as a single magnet, in alternate designs, the magnet 52 can be a series of magnets.

The edge 44 of the seal 40 can be attached to the wing structure 32 in any suitable manner. In this non-limiting embodiment, the seal 40 is rigidly secured to the wing structure 32 also through magnetic coupling. Particularly, a ferromagnetic strip 54 is provided within a cut-out section 56 of the wing structure 32 and a ferromagnetic strip 58 is attached to the underside of the edge 44 to provide a magnetic attraction therebetween that holds the seal 40 to the wing structure 32. This magnetic attraction would likely be greater than the magnetic attraction between the strip 50 and the magnetic 52 so that a greater force holds the seal 40 to the wing structure 32. Although the ferromagnetic strips 54 and 58 are used in this embodiment, other magnetic coupling techniques can be employed to secure the seal 40 to the wing structure 32, such as a combination of ferromagnetic strips and magnets, a combination of magnets, providing the wing structure 32 and/or the seal 40 out of a magnetic material, etc.

Because the seal 40 is not held against the control surface 34 under spring tension it can be a much less robust seal than the known seals in the art while still maintaining a certain amount of rigid flexibility. Further, because the seal 40 is not under spring load tension, it can be much narrow in width than the known blade seals, thus reducing cost and complexity. Also, it is not necessary to perform all the pre-load requirements of the known blade seals because the seal 40 merely clicks into place under magnetic attraction. If the seal 40 needs to be replaced, a technician can use a strong magnet to lift the seal 40 off of the control surface 34 and detach the seal 40 from the wing structure 32. The new seal 40 can then be merely attached to the wing structure 32, where the magnetic attraction between the seal 40 and the control surface 34 provides a self aligning feature so that the seal 40 is properly located.

The embodiment discussed above employs the ferromagnetic strip 50 on the control surface 34 and the magnet 52 on the seal 40 to provide the magnetic coupling therebetween. However, as will be appreciated by those skilled in the art, other alternative embodiments may be equally applicable. For example, two ferromagnetic strips may be employed, one on the seal 40 and one on the control surface 34. Further, two magnets may be employed, one on the seal 40 and the other on the control surface 34. Also, the magnetic coupling between the ferromagnetic strip 50 and the magnet 52 depends on the thickness of the material providing the magnetic attraction. Thus, if the magnet 52 is of a thicker dimension than the strip 50, it may be possible to merely rely on magnetic coupling between the magnet 52 and the seal 40 itself to attach the magnet 52 thereto, which will have a stronger magnetic attraction than the magnetic attraction between the magnet 52 and the strip 50.

Figure 3:
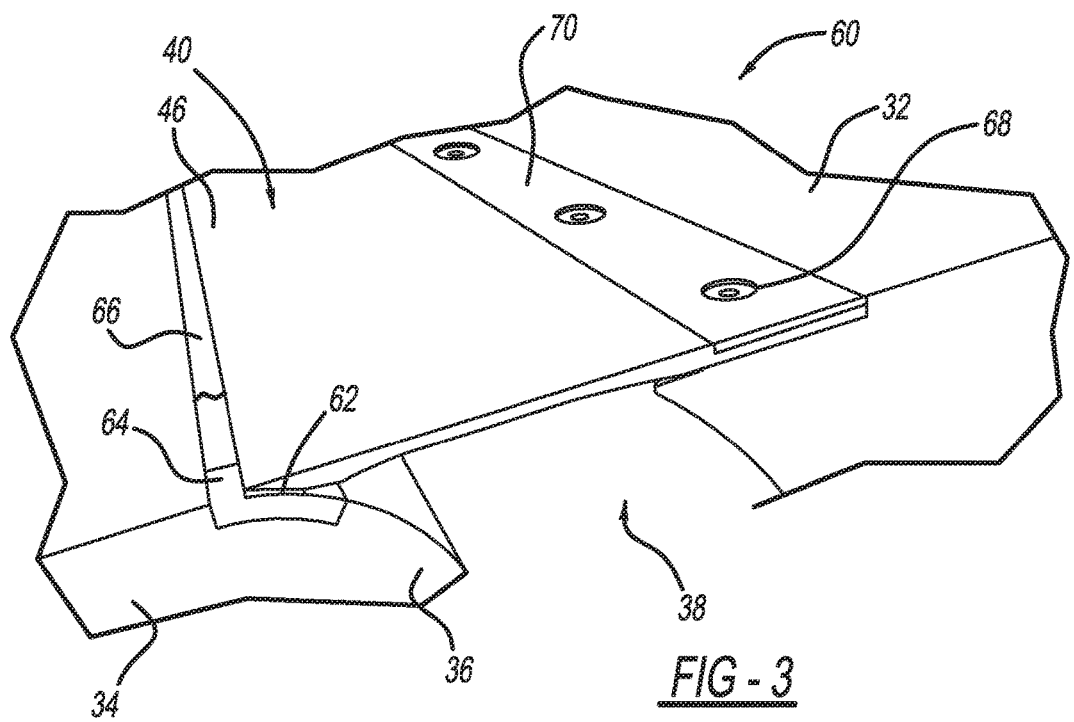
FIG. 3 is a cut-away, isometric view of another aircraft wing including a control surface and a conformal aerodynamic seal, where a magnet is provided on the control surface and a ferromagnetic strip is provided on the seal to provide magnetic coupling therebetween.

FIG. 3 is a cut-away isometric view of an aircraft wing 60 similar to the aircraft wing 30, where like elements are identified by the same reference numeral. In this embodiment, the magnet 52 and the ferromagnetic strip 50 are reversed, where a ferromagnetic strip 62 is provided on the under surface of the seal 40 and an assembly of magnets 64 is configured into the structure of the control surface 34. Also, in this embodiment, the magnets 64 have a general curvilinear shape to conform to the curve of the end portion 36, and have a width suitable for the particular seal 40. A seal layer 66 is shown partially covering the magnets 64 as a wear surface over the magnets 64 to cover the gaps therebetween. Further, in this embodiment, the edge 44 of the seal 40 is bolted to the wing structure 32 using a bolting plate 70 and bolts 66.

Figure 4:
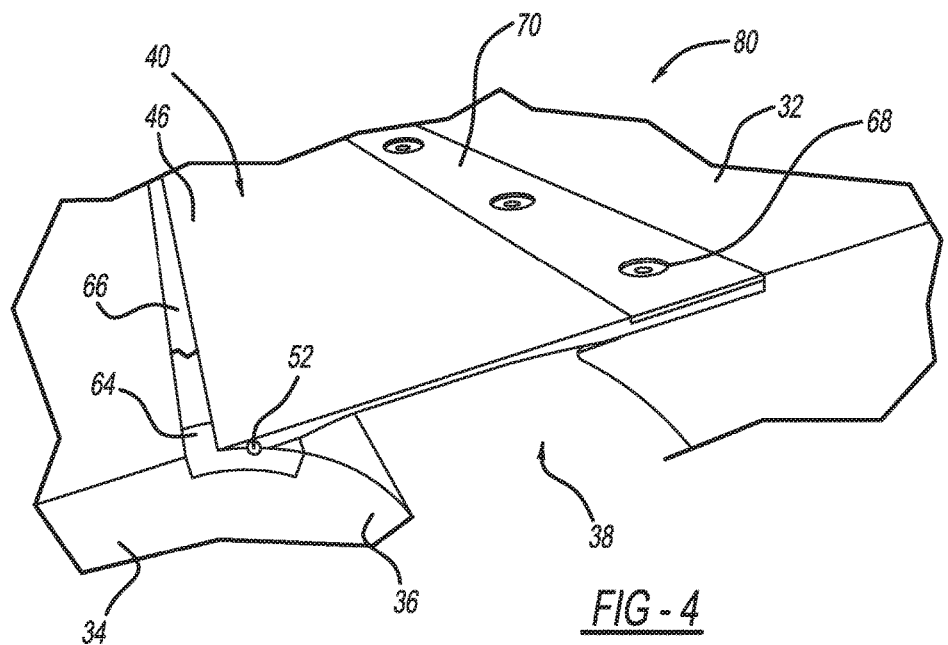
FIG. 4 is a cut-away, isometric view of another aircraft wing including a control surface and a conformal aerodynamic seal, where a magnet is provided on the control surface and a magnet is provided on the seal to provide magnetic coupling therebetween.

FIG. 4 is a cut-away isometric view of an aircraft wing 80 similar to the aircraft wing 60, where like elements are identified by the same reference numeral. In this embodiment, the magnet 52 is attached to the seal 40 and the magnets 64 are provide in the control surface 34 to show the embodiment where only magnets are employed to provide the magnetic coupling between the control surface 34 and the seal 40.

Figure 5:
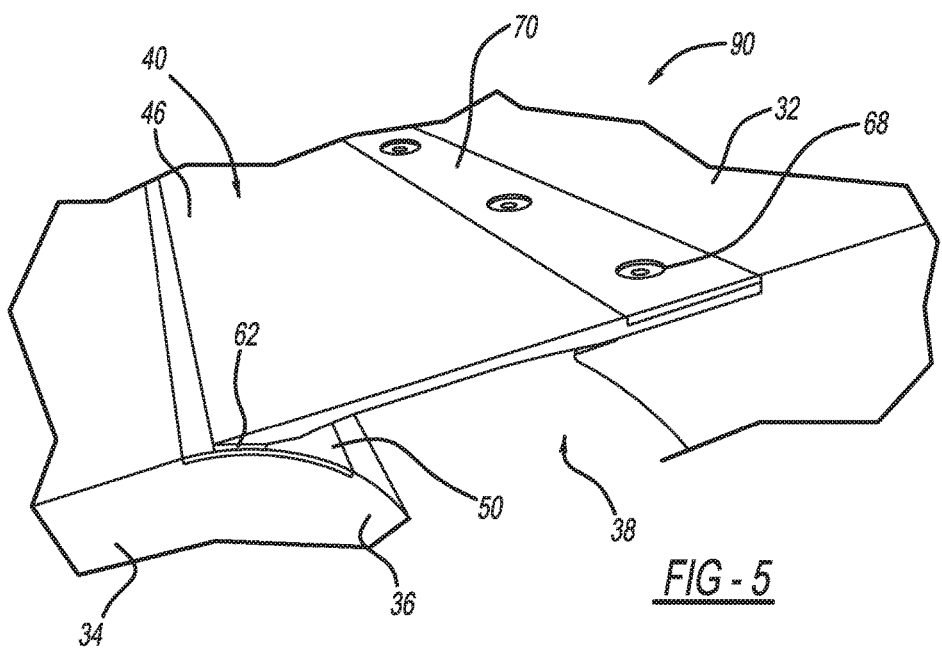
FIG. 5 is a cut-away, isometric view of another aircraft wing including a control surface and a conformal aerodynamic seal, where a ferromagnetic strip is provided on the control surface and a ferromagnetic strip is provided on the seal to provide magnetic coupling therebetween.

FIG. 5 is a cut-away isometric view of an aircraft wing 90 similar to the aircraft wing 60, where like elements are identified by the same reference numeral. In this embodiment, the seal 40 includes the ferromagnetic strip 62 and the control surface 34 includes the ferromagnetic strip 50 to show the embodiment where only ferromagnetic strips are employed to provide the magnetic coupling between the control surface 34 and the seal 40.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An aircraft comprising:
   an aircraft structure;
   a control surface pivotally coupled to the aircraft structure, the control surface having a top and bottom surface; and
   a seal having a first edge and a second edge, said first edge of the seal being rigidly coupled to the aircraft structure and said second edge of the seal being slidably coupled to the control surface by magnetic coupling such that when the control surface pivots relative to the aircraft structure, the second edge of the seal slides along the top or bottom surface of the control surface.

2. The aircraft according to claim 1 wherein the control surface includes one or both of a ferromagnetic strip and at least one magnet and the second edge of the seal includes one or both of a ferromagnetic strip and at least one magnet to provide the magnetic coupling between the seal and the control surface.

3. The aircraft according to claim 1 wherein the control surface includes a ferromagnetic strip and the second edge of the seal includes at least one magnet to provide the magnetic coupling between the seal and the control surface.

4. The aircraft according to claim 3 wherein the at least one magnet is a cylindrical magnet.

5. The aircraft according to claim 3 wherein the ferromagnetic strip is adhesively bounded to the control surface.

6. The aircraft according to claim 3 wherein the ferromagnetic strip is part of an assembly that is bolted to the control surface.

7. The aircraft according to claim 3 wherein the at least one magnet is a plurality of magnets.

8. The aircraft according to claim 3 wherein the ferromagnetic strip has a curve-linear configuration to conform to a rounded edge of the control surface.

9. The aircraft according to claim 1 wherein the control surface includes at least one magnet and the second edge of the seal includes a ferromagnetic strip to provide the magnetic coupling between the seal and the control surface.

10. The aircraft according to claim 9 wherein the at least one magnet is a plurality of magnets extending along a line.

11. The aircraft according to claim 1 wherein the control surface includes a ferromagnetic strip and the second edge of the seal includes a ferromagnetic strip to provide the magnetic coupling between the seal and the control surface.

12. The aircraft according to claim 1 wherein the control surface includes at least one magnet and the second edge of the seal includes at least one magnet to provide the magnetic coupling between the seal and the control surface.

13. The aircraft according to claim 1 wherein the first edge of the seal is bolted to the aircraft structure.

14. The aircraft according to claim 1 wherein the first edge of the seal is magnetically coupled to the aircraft structure.

15. The aircraft according to claim 1 wherein the aircraft structure is an aircraft wing, an aircraft stabilizer or an aircraft tail.

16. The aircraft according to claim 1 wherein the control surface provides one of roll, pitch or yaw control for the aircraft.

17. A blade seal system comprising:
    an aircraft structure;
    a control surface pivotally coupled to the aircraft structure, the control surface having a top and bottom surface; and
    a blade seal for sealing a gap between the aircraft structure and the control surface, said seal having a first edge, a second edge, being flexible and including at least one magnet that allows the blade seal to be magnetically coupled to the top or bottom surface of the control surface and be slidable relative thereto;
    wherein the first edge of the seal is rigidly coupled to the aircraft structure.

18. The blade seal system according to claim 17 wherein the at least one magnet is a cylindrical magnet.

19. The blade seal system according to claim 17 wherein the at least one magnet is a plurality of magnets.

20. An aircraft wing comprising:
    a main wing structure;
    a control surface pivotally coupled to the wing structure, said control surface including a first magnetic member, a top surface and a bottom surface; and
    a seal having a first edge and a second edge, said second edge including a second magnetic member, said first edge of the seal being rigidly coupled to the wing structure and said second edge of the seal being slidably coupled to the control surface by magnetic coupling between the first and second magnetic members such that when the control surface pivots relative to the wing structure, the second edge of the seal slides along the top or bottom surface of the control surface.

* * * * *